United States Patent [19]
Cohen et al.

[11] Patent Number: 5,415,155
[45] Date of Patent: May 16, 1995

[54] MODULAR ELEMENT WITH MULTIPLE CONDUITS

[76] Inventors: Jacques Cohen, 60 Aldred Crescent, Hampstead, Québec, Canada, H3X 3J1; Martin Scholler, 400, Marie Victorin Street, Boucherville, Québec, Canada, J4B 1W2

[21] Appl. No.: 148,340

[22] Filed: Nov. 8, 1993

[51] Int. Cl.$^6$ .............................................. F24J 2/24
[52] U.S. Cl. ................................... 126/663; 138/111; 138/115; 138/155
[58] Field of Search ......................... 138/111, 115, 155; 126/663, 664, 665

[56]  References Cited

U.S. PATENT DOCUMENTS

| | | | |
|---|---|---|---|
| 376,562 | 1/1888 | Van Buren et al. | 138/115 |
| 1,899,861 | 2/1933 | Gackenbach | 138/115 |
| 3,239,000 | 3/1966 | Meagher | 126/663 |
| 3,679,531 | 7/1972 | Wienand et al. | 138/111 |
| 4,144,874 | 3/1979 | Zebuhr | 126/663 |
| 4,222,373 | 9/1980 | Davis | 126/664 |
| 4,291,683 | 9/1981 | Bayles | 126/663 |
| 4,426,999 | 1/1984 | Evans et al. | 126/663 |
| 4,712,338 | 12/1987 | Trickel | 126/663 |
| 4,867,133 | 9/1989 | Sadler | 126/663 |

FOREIGN PATENT DOCUMENTS

| | | | |
|---|---|---|---|
| 4248 | 12/1900 | Austria | 138/111 |
| 991373 | 6/1976 | Canada | |
| 1059396 | 7/1979 | Canada | |
| 1065219 | 10/1979 | Canada | |
| 1097168 | 3/1981 | Canada | |
| 1117388 | 2/1982 | Canada | |
| 1130672 | 6/1982 | Canada | |
| 2018746 | 5/1990 | Canada | |

*Primary Examiner*—Carroll B. Dority
*Attorney, Agent, or Firm*—Pierre Lespérance; Francois Martineau

[57]  ABSTRACT

This modular element has several conduits disposed side by side, each pair of adjacent conduits being interconnected to form a rigid or flexible unit, each conduit has a male end and an opposite female end, the latter for joining with the male end of an aligned conduit of an adjacent modular element. The several conduits of a first modular element can therefore be simultaneously extended by the several conduits of a second modular element by simultaneously joining the female and male ends of the elements. These elements can be in the form of panels to be joined together to form, for instance, a solar panel or a floor covering with a circulating heat transfer fluid through the conduits. The conduits may also serve as protected passages for underground electrical wires. The conduits may be provided with sprinkler holes to water plants. The panels preferably have interlocking means on their sides which are parallel to the conduits for interlocking adjacent panels and these sides may be provided with fastening zones to fasten the panels to an underlying surface. The panels can be fitted with a transparent cover enclosing an air chamber allowing sun rays therethrough but preventing heat escape when used as solar panels.

5 Claims, 4 Drawing Sheets

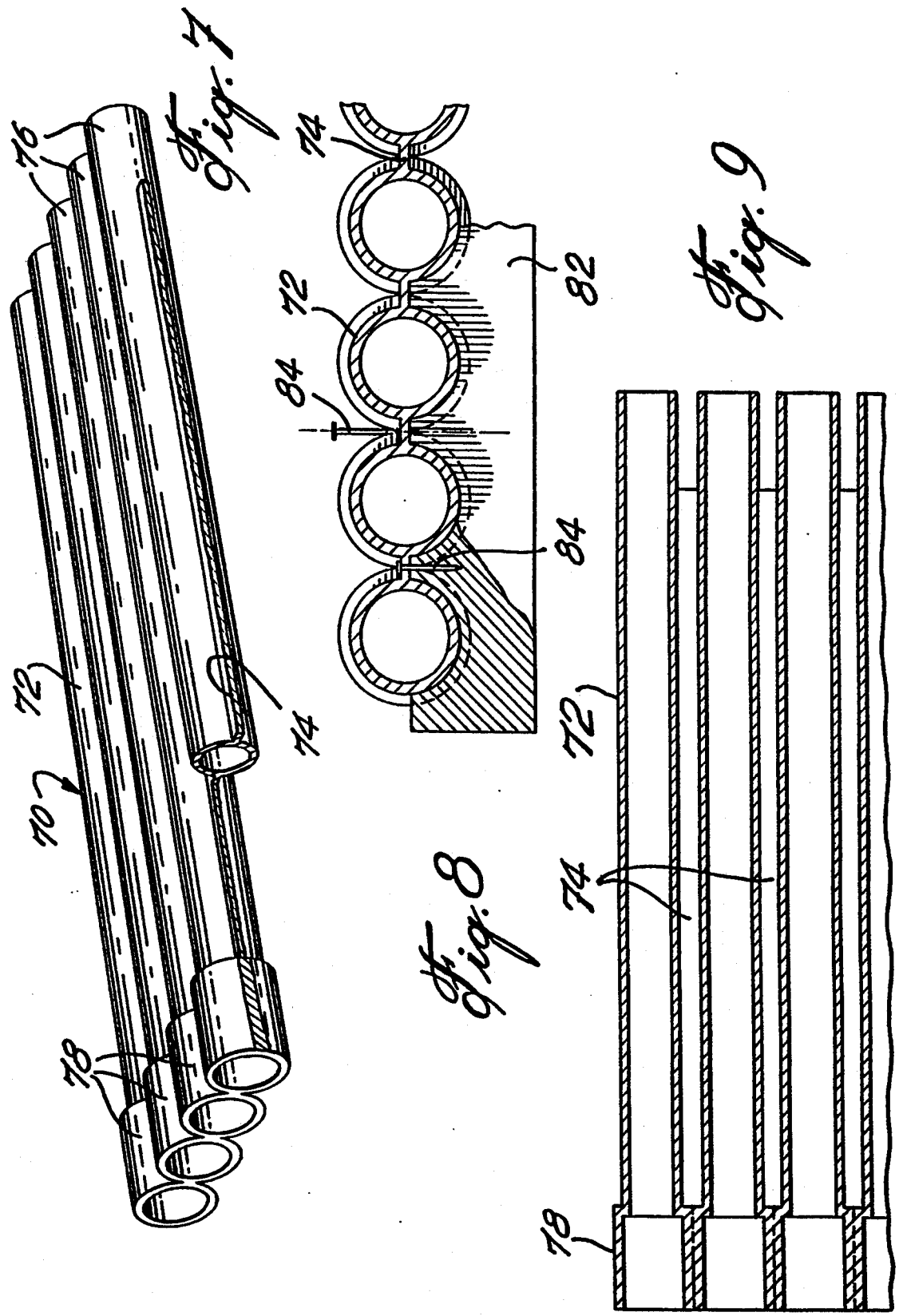

MODULAR ELEMENT WITH MULTIPLE CONDUITS

FIELD OF THE INVENTION

The present invention relates to conduits for circulating fluids or for housing electric wires.

BACKGROUND OF THE INVENTION

It is known to provide modular elements of generally quadrangular shape and provided with interconnecting means along its sides for joining with adjacent modular elements. For instance, such modular elements may be tiles which are assembled to form a complete floor covering of a dimension in accordance with a floor to be covered without having to discard an inordinate amount of tile material which would be the case if the floor covering would consist of a large sheet to be cut out to suit the shape and size of the floor to be covered.

It is also known to provide solar panels with passageways incorporated therein for the circulation of a heat transfer medium. However, such panels are large panels and difficulty is often encountered in sizing the panels to suit the particular roof in which they are intended to be installed and also difficulty is also encountered in joining the passageways of the panel to fluid discharge and supply piping.

It is known to provide separate cylindrical conduits to protect underground electric power cables or telephone lines, said conduits adapted to be arranged side by side and stacked in vertical rows by means of spacers and adapted to be connected in end to end relation by junction collars. It is known that such separate conduits often break during their handling and that their positioning within a trench is time consuming.

OBJECTS OF THE INVENTION

It is a general object of the present invention to provide a modular element which will overcome the above-noted disadvantages.

A more specific object of the present invention is to provide a modular element preferably formed by injection or compression moulding and defining a plurality of open-ended conduits disposed side by side and adapted to be joined with the aligned conduits of an adjacent modular element.

Another object of the invention is to provide such a modular element in the form of a panel or tile of quadrangular shape, the tiles being joined to each other at their conduit ends and also side by side by interconnector means.

Another object of the present invention is to provide roof tiles for use as solar panels.

Another object of the present invention is to provide flooring tiles to be used as cushioning tiles or for radiant cooling or heating.

SUMMARY OF THE INVENTION

The modular element of the present invention comprises several conduits disposed side by side in spaced and parallel relationship, each pair of adjacent conduits being rigidly or flexibly interconnected, each conduit having a male and an opposite female end, the latter for connection with the male end of an aligned conduit of an adjacent modular element whereby the several conduits of a first modular element can be simultaneously extended by the several conduits of a second modular element by simultaneously joining the female and male ends of the conduits of said adjacent elements.

In accordance with one embodiment, a web interconnects each pair of adjacent conduits, the male end being formed by a conduit extension beyond the web, the female end being formed by a conduit enlargement, preferably disposed beyond the web and directly joined to the enlargement of an adjacent conduit.

In accordance with another embodiment of the invention, each modular element forms a quadrangular shaped body with parallel sides, two by two, the conduits being formed by throughbores made in said body, the male and female ends transversely aligned along two first parallel sides and further including complementary interlocking means extending along the two remaining second parallel sides for interlocking one modular element with an adjacent element in side by side position; preferably the body forms top and bottom continuous parallel faces with the conduits extending through the body and parallel to the faces, the male ends of the conduits formed by nipples protruding from one side of the body.

In accordance with one embodiment, the panel has perforations communicating with at least some of the conduits and opening at one of said faces to serve as a liquid sprinkling system, for instance for watering plants.

In accordance with another embodiment, the tiles can be used as roofing tiles while the conduits serve for the circulation of a heat transfer liquid, these tiles having means for fastening the same to the roof under an overlapping portion of an adjacent tile. Preferably, the interlocking means include a lower flap and an upper flap laterally protruding from the sides of the tiles which are parallel to the conduits, these flaps offset thicknesswise of the panel to underlap and overlap respectively the upper flap and the lower flap of an adjacent modular element. These flaps carry complementary tongue and groove means formed in the lapping surfaces of the flaps.

In accordance with one embodiment, the roof tile serving as a solar heat collector tile is provided with a transparent cover defining a closed air space facing the sun to constitute a heat insulating medium to prevent escape of the heat collected by the tile.

Preferably, there are provided manifold elements for connection to the several conduits of a tile for feeding and discharging a fluid medium to said conduits.

The foregoing will become clearer by referring to the annexed drawings in which like reference characters indicate like elements throughout.

BRIEF DESCRIPTION OF THE DRAWINGS

FIG. 7 is a perspective view of an assembly of conduits in accordance with still another embodiment;

FIG. 8 is a cross-section of the conduits assembly and also of a supporting spacer shown in partial elevation and in partial section;

FIG. 9 is a plan section through the conduits assembly of FIG. 7.

DETAILED DESCRIPTION OF THE PREFERRED EMBODIMENTS

Figure 1:
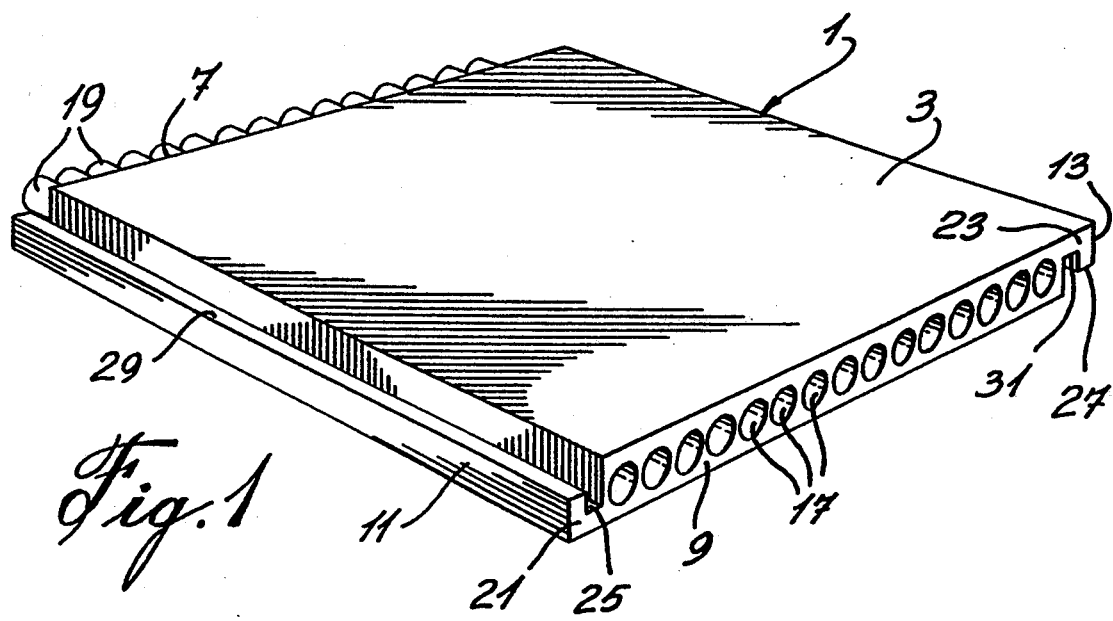
FIG. 1 is a perspective view of a first embodiment of the modular element of the invention.
Figure 2:
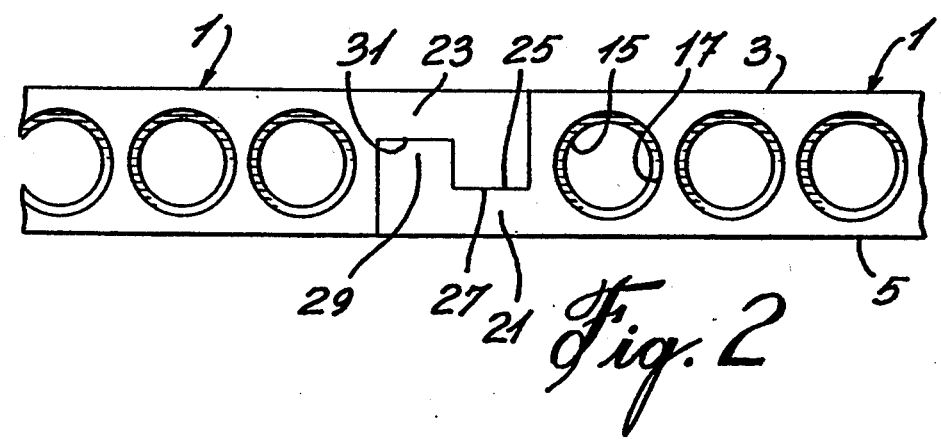
FIG. 2 is a partial end elevation of two interconnected modular elements in accordance with FIG. 1.
Figure 3:
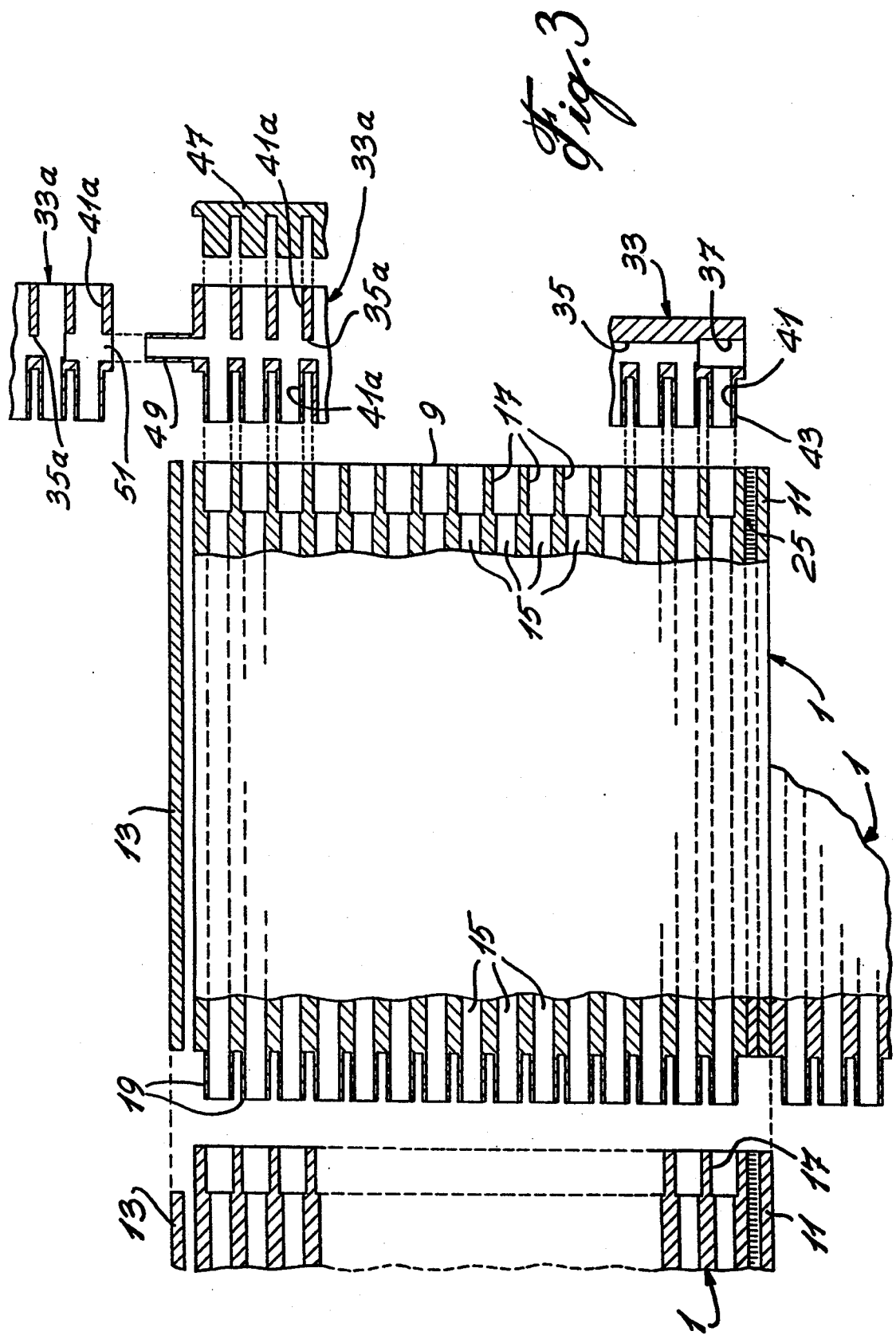
FIG. 3 is a plan section of the modular element of FIG. 1 also showing part of two adjacent modular elements and portions of manifold elements to be connected to the modular element.

The first embodiment of the invention is illustrated in FIGS. 1, 2 and 3. There is provided a panel or tile 1 which is molded, for instance by injection or compression molding, in a one piece body. Panel 1 has a generally quadrangular shape when seen in plan view with main continuous and parallel top and bottom faces 3 and 5 and a first pair of parallel side edges 7 and 9, and a second pair of parallel side edges 11 and 13 which are normal to edges 7 and 9. A series of throughbores 15 are made through the thickness of panel 1, being parallel between themselves and parallel to the top and bottom faces 3 and 5 and to the second side edges 11 and 13. The bores 15, which are preferably cylindrical but which may have any other cross-sectional shape, serve as conduits for the circulation of a fluid or for receiving electrical wires.

Panel 1 is a modular element and can be connected to similar modular elements to form rows of said elements in two perpendicular directions.

One end of the bores 15 forms at panel edge 9, a female junction end 17 defined by an enlargement of the bore 15. The opposite end of each bore 15 defines a male junction end 19 formed by a nipple which protrudes from the side edge 7 of panel 1. Each nipple 19 has an external dimension such as to have a sliding fit with the female end 17 of the bore 15 of an adjacent panel 1. The length of the enlarged female end 17 and of nipple 19 are such that when nipples 19 are fully engaged in the enlarged ends 17 of an adjacent modular element, the two modular elements have their side edges 7 and 9 in substantially complete abutment.

The joints formed by female ends 17 and male ends 19 can be made fluid-proof by using any kind of known means, for instance, by soldering the two joined ends if the panels 1 are made of metal or by using high frequency localized melting or by using a suitable adhesive if they are made of plastic. Also, O-ring seals may be used.

The panels or tiles 1 are also interconnected in transverse rows by complementary interconnecting means located along their second side edges 11 and 13. Edge 11 forms an underflap 21 while opposite edge 13 forms an upper flap 23. Both flaps have a smaller thickness than that of the tile 1, the two flaps are offset thicknesswise of the panel 1, the outer face of the underflap 21 being a continuation of the bottom face 5 and the outer face of the upper flap 23 being a continuation of the top face 3. The two flaps have lapping surfaces 25, 27 respectively. A tongue 29 protrudes upwardly from the lapping surface 25 along its free edge while a complementary groove 31 is formed in the lapping surface 27 of the upper flap 23. Therefore, two adjacent tiles or panels 1 may be interconnected side by side as shown in FIG. 2 in a direction transverse to the throughbores 15 by the upper flap 23 lapping the underflap 21 of an adjacent tile and by engagement of a tongue 29 within the corresponding groove 31 as shown in FIG. 2. In interconnected position, the side edges 7 and 9 are in substantial abutment.

The conduits are fed with a fluid in parallel by a manifold 33 in the form of an elongated member having a longitudinal throughbore 35 forming an enlargement 37 at one end which defines a female port and forming at its opposite end a nipple similar to nipple 19 to serve as a male port. The manifold 33 has a length about equal to that of side 7 or 9 of panel 1 and several manifolds can be connected in end to end relation.

Bore 35 communicates with a series of lateral bores 41 which, in the case shown, are formed by male nipples 43 adapted to be inserted into the enlarged female ends 17 of the throughbores 15 of panel 1.

Obviously, a manifold with female junction ends for the transverse bores 41 could be provided so as to be joined with the side of the panel 1 provided with male ends or nipples 19.

A modified manifold 45 is also shown in which the longitudinal bore 35a is in communication not only with transverse bores 41a corresponding to bores 41 of manifold 33 but also with opposite transverse bores 41a which can be connected to the male nipples of an adjacent panel 1, the manifold 41 extending between the two panels. If the bores 45 are not used, they can be plugged by a multi-plug unit 47.

Manifold 33a has a nipple or male port 49 at one end adapted to be connected to a female port 51 at the other end of an adjacent manifold 33a.

Manifolds 33 or 33a can be used at the inlets and outlets of a series of tiles intercommunicating together, the tiles 1 can be assembled together with the manifolds 33 or 33a and adhered to a floor, to a wall or other surface with the manifolds connected to a heating or cooling liquid supply to form radiant cooling or heating surfaces.

The panels can be assembled to form a covering of any desired size and shape; any external panel which may have to be cut to conform to the desired size of the surface to be covered will have its bores or conduits 15 plugged by the multi-plug unit 47 while the manifold 33a will be used at any position suitable for connection to the supply and discharge piping of the cooling or heating liquid.

The conduits 15 can be arranged to be all parallel-connected or arranged to have a group of parallel bores series connected with other groups of such parallel bores.

Figure 4:
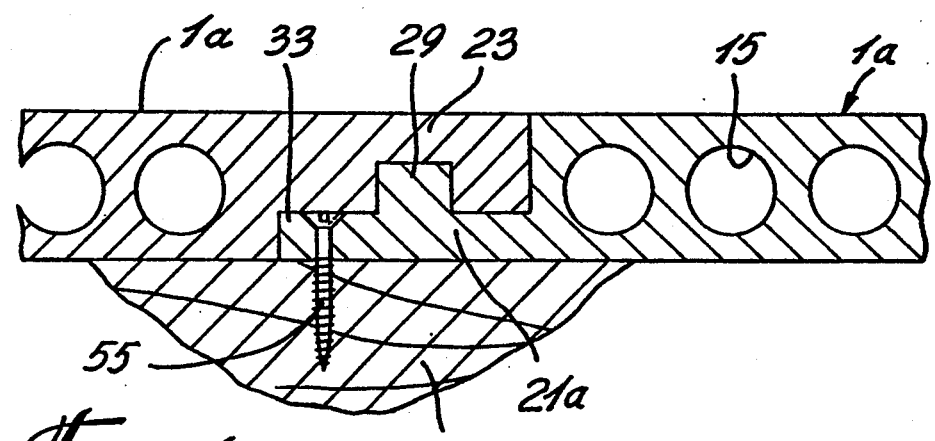
FIG. 4 is a partial section of two adjacent modular elements interconnected together and fastened to an underlying support.

FIGS. 4 shows a modification in which the panel 1a is provided with an underflap extension 21a serving as a nailing or fastening zone 53 which serves to secure by screws 55 or the like, the panel 1a to a support surface 57. Obviously, the tongue and groove 29, 31 could be provided with lateral clip means to clip the lapping flaps 21a, 23 positively one to another. Panel 1a could be used to form a solar panel on a roof.

Figure 5:
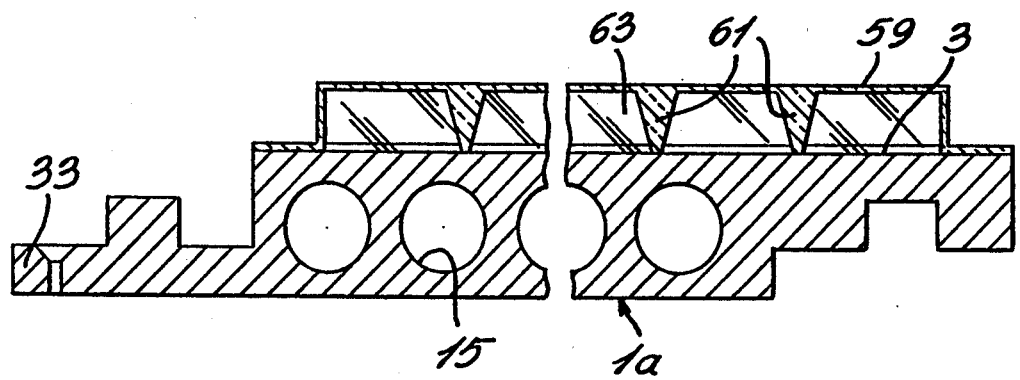
FIG. 5 is a partial section of the modular element in accordance with FIG. 4 and further modified to show a transparent cover secured thereto.

The panel 1a when used as a solar panel is preferably provided with a cover 59 as shown in FIG. 5. This cover is molded from transparent plastic and is applied and fixed to the top face 3 of each panel; it has intermediate support legs 61. Thus, an air space 63 is enclosed by the cover 59 and top face 3 of panel 1. Sun rays can pass through the cover to heat the liquid within the conduits 15 while the air space 63 acts as an insulation to prevent escape of the heat from the panels towards the sky.

Figure 6:
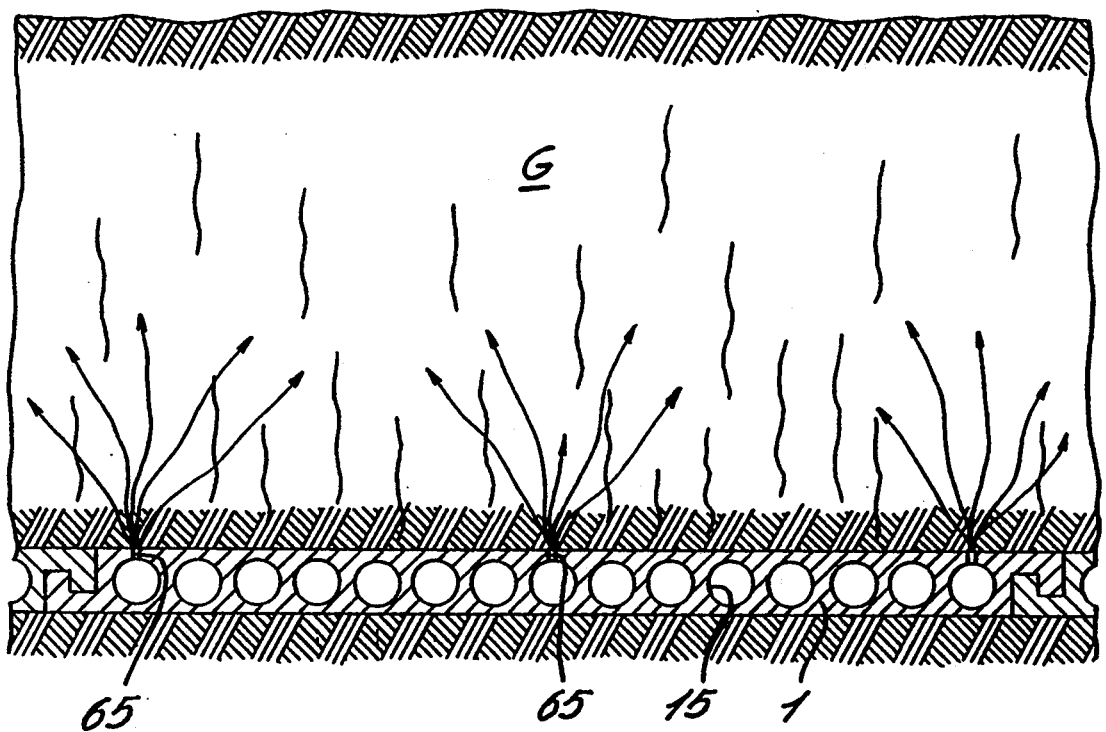
FIG. 6 is a cross-section of a soil layer with buried, interconnected modular elements in accordance with FIG. 1 but modified to provide sprinkling holes to water plants.

FIG. 6 shows that at least some of the bores 15 of panel 1 can be provided with a series of longitudinally spaced perforations or holes 65 to supply water to soil G in which the panels 1 are buried; thus plants growing in soil G (not shown) can be watered from underground. Obviously, the panel 1 or 1a with the watering holes 65 could be used for watering plants from an overhead position.

FIGS. 7, 8 and 9 show a modular element 70 which consists in a plurality of thin walls cylindrical conduits 72 extending side by side in parallel relationship with each pair of adjacent conduits 72 rigidly interconnected by a web 74. Each conduit 72 has a male end 76 which extends beyond the corresponding end of web 74. Each conduit 72 has an opposite female end 78 formed by a cylindrical enlargement of the conduit 72 and of a length and internal diameter to fit over the male end 76 of a conduit of an adjacent modular unit 70 laid in longutidinal alignment with the first modular element 70. Therefore, several conduits may be simultaneously connected to similar conduits of another modular element to extend each conduit system as desired. The female end 78 of any two adjacent conduits 72 are preferably directly joined as shown in FIG. 9. Therefore, at this end, the web 74 terminates at the start of the enlarged female end 78.

Modular elements 70 can be used to protect underground telephone or electric power cables and are much easier and faster to install than the conventional individual conduits. They may be fixed to upright spacers 82, for instance, by means of nails or screws 84 driven through the webs 74.

The modular elements of the invention can be used as a floor, wall or roof covering for radiant heating or cooling, for instance as heating mats for piglets; they may cover the bottom of a swimming pool to heat the latter; they may be used under the ice of a skating rink and circulated with a refrigerant. When used as cooling surfaces, they can also be installed in refrigerated containers or refrigerated railway wagons and storage rooms.

The conduits may be used also for circulating air or other gases.

The modular elements can be made of elastomer and since they have a tubular design, they can be used as a cushioning floor tile without any fluid circulation.

The modular elements of the invention are produced by injection or compression molding; they may be made of any kind of plastic of any desired hardness or of an elastomer. In the latter case, the conduits can be circulated with air under pressure to form, for instance, a mattress for use in a wrestling rink.

When the panels are used for circulation of a heat transfer fluid, a heat conducting powdered metal can be incorporated into the plastic for improving the heat conductance.

We claim:

1. A modular element comprising:
 (a) several conduits disposed side by side spaced from and parallel to one another, each pair of adjacent conduits being interconnected along their length to form a unitary body, each conduit having a male end and an opposite female end, the latter for connection with the male end of an aligned conduit of an adjacent modular element, whereby the several conduits of a first modular element can be simultaneously extended by the several conduits of a second modular element by simultaneously joining the male and female ends of said elements; and
 (b) a manifold element comprising an elongated body having a longitudinally extending bore with a communication port at one end and a series of lateral junction conduits communicating with said bore and opening at one of the longitudinal sides of said elongated body for joining with the ends of the conduits of an adjacent modular element;
 the length of said manifold element being substantially equal to said first sides of said panel and said lateral junction conduits are joinable with the ends of all the conduits of an adjacent modular element;
 said elongated body forming said manifold element having a second communication port at its opposite end, each joinable with the first communication port of a manifold element, disposed in alignment with said first named manifold element; wherein said manifold element has a second series of lateral junction conduits commnicating with said longitudinal bore and opening at the other longitudinal side of said elongated body for joining with the conduits of a modular element disposed adjacent said other longitudinal side of said elongated body.

2. A modular element comprising several conduits disposed side by side spaced from and parallel to one another, each pair of adjacent conduits being interconnected along their length to form a unitary body, each conduit having a male end and an opposite female end, the latter for connection with the male end of an aligned conduit of an adjacent modular elements, whereby the several conduits of a first modular element can be simultaneously extended by the several conduits of a second modular element by simultaneously joining the male and female ends of said elements;
 said modular element having a quadrangular shape with four sides parallel two by two, the male ends and the female ends extending along two first parallel sides, and complementary interlocking means extending along the two remaining second parallel sides for interlocking one modular element with an adjacent modular element in side by side position transversely of said conduits;
 said modular element consisting of a panel forming a body having continuous parallel flat, top, and bottom faces with the conduits formed by throughbores extending through the body and parallel to said surfaces, the male ends of said conduits formed by nipples protruding from one side of said body; wherein said interlocking means includes a lower flap and an upper flap laterally protruding from said two second sides respectively and offset thicknesswise of said panel to underlap and overlap respectively the upper flap and the lower flap of adjacent modular elements, and complementary tongue and groove means formed in the lapping surfaces of said flaps.

3. A modular element as defined in claim 2, wherein said lower flap forms a fastening zone exteriorly of said tongue and groove means.

4. A modular element as defined in claim 2, wherein said lower flap forms a fastening zone exteriorly of said tongue and groove means and further including a transparent cover fixed to said panel and spacedly extending over said top face and forming a closed air chamber with said top face.

5. A modular element as defined in claim 1, further including a multiple plug in the form of a strip defining a series of interconnected plug portions adapted to register with and close a series of said lateral junction conduits.

* * * * *